John A. C. Yule
INVENTOR.

BY
ATTORNEYS

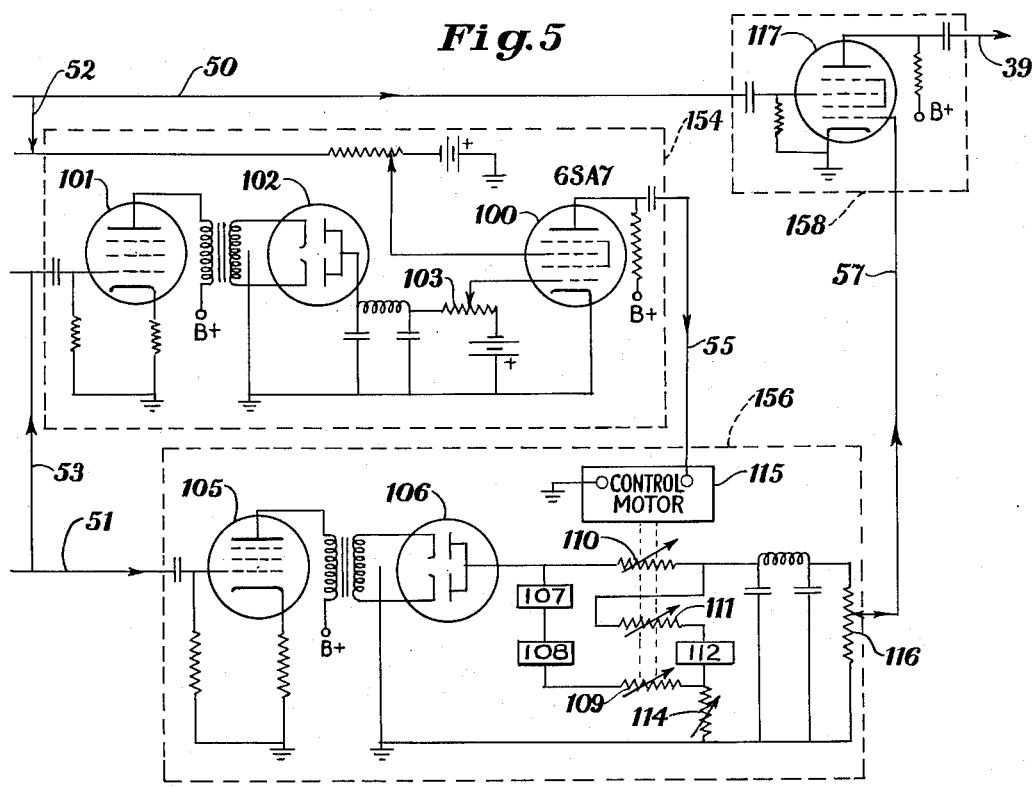
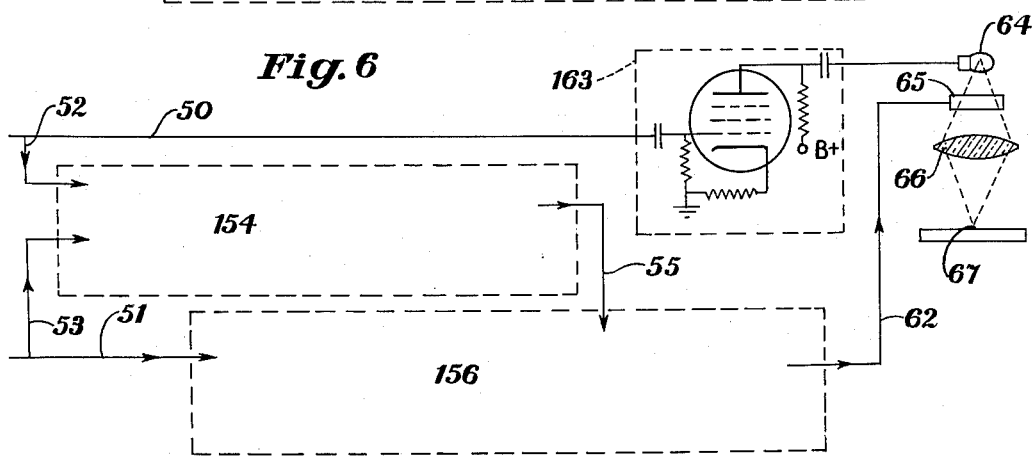
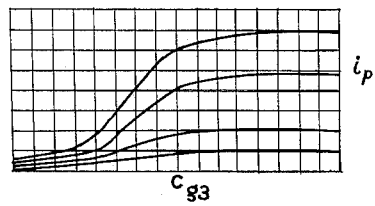

John A. C. Yule
INVENTOR.

Oct. 25, 1955 J. A. C. YULE 2,721,892
VARIABLE ELECTROOPTICAL COLOR CORRECTION
Filed June 27, 1951 5 Sheets-Sheet 5
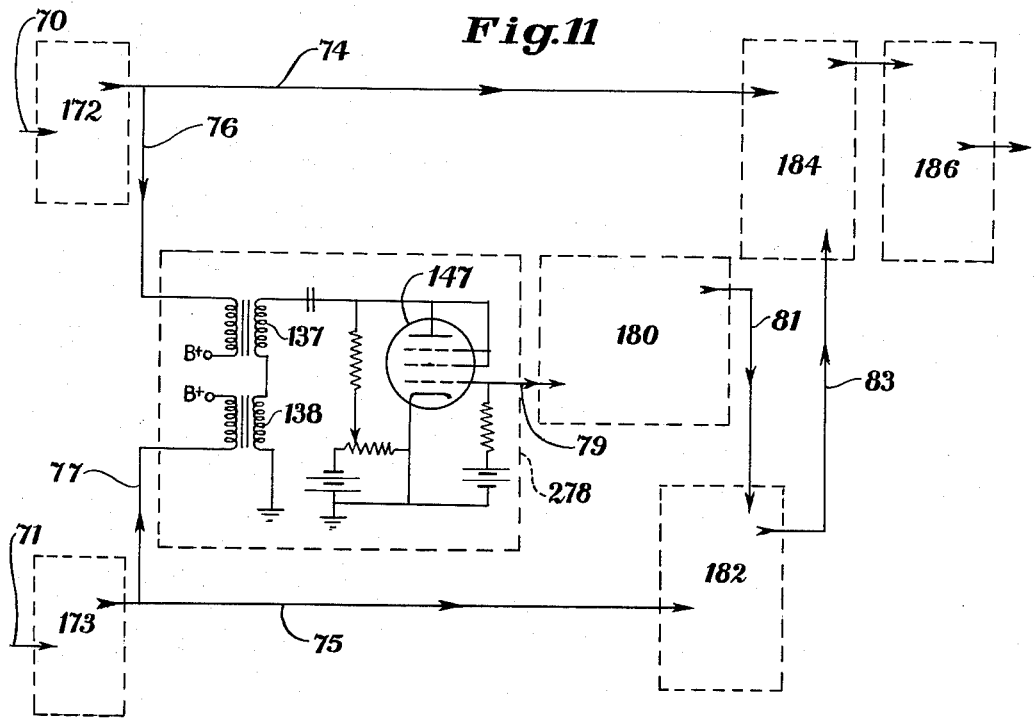
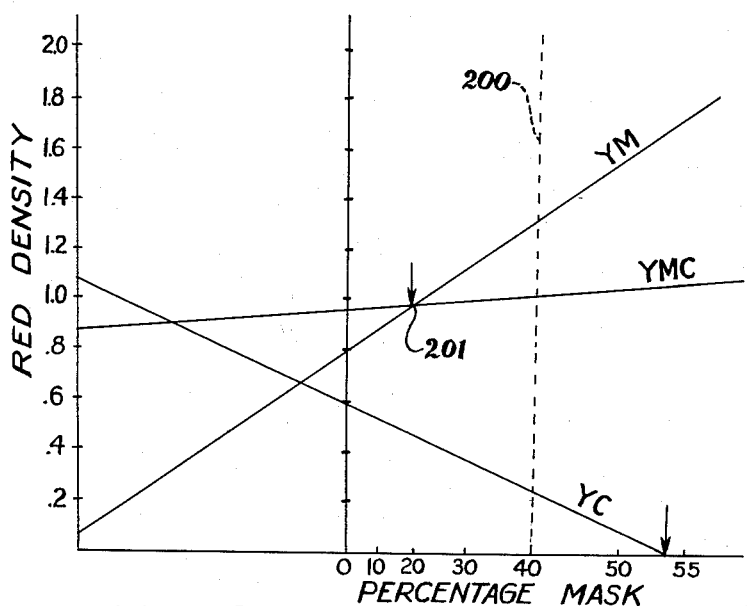
John A. C. Yule
INVENTOR.
BY Daniel I. Mayne
F. W. Emerson Holmes
ATTORNEYS

United States Patent Office 2,721,892
Patented Oct. 25, 1955

2,721,892

VARIABLE ELECTROOPTICAL COLOR CORRECTION

John A. C. Yule, Rochester, N. Y., assignor to Eastman Kodak Company, Rochester, N. Y., a corporation of New Jersey Application June 27, 1951, Serial No. 233,918

28 Claims. (Cl. 178—5.2)

This invention relates to the electrooptical production of color separation records (negatives or positives) from a multicolored original or from other color separation records, the purpose of the electrooptical step being to introduce color correction including the equivalent of photographic masking.

The object of the invention is to provide a method of color correction which produces better color quality than previously obtainable. Specifically it is the object of the invention to provide correct or approximately correct color correction over a wider gamut of colors than prior masking systems of either the photographic or electrooptical types.

Color correction by masking primarily involves a correction of the blue separation record (negative) or blue signal by the green separation record (positive) or green signal, and a corresponding correction of green by red. In some cases the blue signal or the blue negative is also corrected in accordance with the red signal or red separation, but the correction is still predominately by green. Similarly it is not unusual to correct green by blue, but again the predominant correction of green is by red. Since the present invention is equally applicable to the correction of blue and the correction of green, these may be referred to as the gross primary color signals, each having its corresponding predominant masking color, namely green in the case of blue and red in the case of green. The present invention is applicable to all of these corrections. It is particularly applicable to the main corrections of blue by green and green by red. The most important case as far as the present invention is concerned, is in connection with the correction of green by red since the defects of ordinary masking are greatest in this case.

The masking factor or degree of correction of green by red depends on various factors many of which are well known. I have found that this correction should be different for different colors in the original. For example, if one uses the masking factor which properly corrects the green separation to reproduce a greenish hue such as green grass in an original scene, the same green separation is overcorrected in another part of the picture involving reddish hues. Contrariwise if the masking factor is selected to give the proper reproduction of reds, the greens are undercorrected and green grass appears brownish in the reproduction. Considering this phenomenon with respect to electrooptical color correction it is found that the correction factor of the green signal which gives proper reproduction of red is the factor which matches the green signal from a full red to the green signal from a full black. This factor may be referred to as $K_1$. On the other hand, a different correction factor is required for proper reproduction of green, namely the correction factor which matches the green signal from a full green patch in the original to the green signal from white. This may be referred to as $K_2$.

There are many shades and brightnesses of reds, greens and of "black" for that matter and for precise definition of the present invention, it is necessary first to define exactly which red, which green and which black are involved as standards. In terms of any three color printing process the ultimate primary red is that produced by mixing the yellow and magenta inks, "full red" being the name of the color produced by solid yellow and solid magenta superimposed. Following custom (see my article "Theory of subtractive color photography II, prediction of errors in color rendering under given conditions," Journal of the Optical Society, December 1938, vol. 28, p. 481) this shade of red is herein termed "YM red." Adding solid cyan to this red gives a full black or "YMC black," which as is well known, may actually appear brownish due to the different strengths of the printing inks. Similarly, the pertinent shade of green is YC green (from yellow and cyan). These colors can generally be called simply red, green and black and the precise name will be used only where necessary.

According to the invention the green signal is corrected by a masking signal (a predominantly red masking signal) the correction factor having a value between $K_1$ and $K_2$ which increases continuously with increasing green signal and decreases continuously with increasing masking signal. For perfect results the theoretical limits of the variation should be exactly $K_1$ and $K_2$, but useful results are obtained for all values within this range and even overrunning these limits somewhat at either or both ends, provided the variation is a continuous one and is in the proper direction as just specified. In one practical example the masking factor has been found to vary between .25 and .50. That is $K_1=.25$ and $K_2=.50$. Fig. 8 of the above-mentioned article in the J. O. S. A., 1938, illustrates a case where $K_1$ (matching YM to YMC) is about .19 and $K_2$ (matching YC to white) is about .54, the masking factor being given along the top of Fig. 8 in the publication.

In general the masking factor varies between a lower limit L and an upper limit $L_2$. Former processes had zero variation, i. e. constant or substantially constant masking factor. Any variation in the proper direction presumably is an advantage, but worthwhile improvements are obtained only if the range is reasonably large. The ideal range for ordinary originals would be $K_2-K_1$ as above defined, i. e. would have $L_1$ equal to $K_1$ and $L_2=K_2$. As a practical matter small variations from this ideal are not detectable in the final results and excellent quality is obtained with $L_1=K_1\pm\frac{1}{4}(K_2-K_1)$ and $L_2=K_2\pm\frac{1}{4}(K_2-K_1)$. This method of defining tolerances permits $L_1$ under unusual circumstances to reach zero or go even slightly negative. This is appropriate to the unusual circumstances which would cause it and therefore the definitions of the limits are universally appropriate.

In general a gross color signal is masked by the corresponding masking signal by multiplying the gross signal by the inverse of the masking signal which has been modified exponentially by the variable masking factor discussed above. The exponential relationship may be thought of in terms of logarithms in which case the red and green signals are amplified logarithmically. In one embodiment a factor signal is produced proportional to a constant plus a second constant times the difference between the logarithm signals. A masking signal is then produced equal to the product of this factor signal and the logarithm red signal and finally the green signal is masked by subtracting the masking signal from it.

This novel method of color correction is applicable to all types of electrooptical color reproduction. It may be used along with other types of correction, such as unsharp masking, the production and use of a black printer in any of its multitudinous forms, outline effects, etc. The masking signal may be derived by a separate scanning system or, as is more usual, it may be derived from the primary color signals. The present invention is not concerned with such details but merely with the manner in which a gross color signal is corrected by a masking signal. The actual masking or modification of one signal by another is usually produced electrically, but the known optical equivalent in which the modulation is produced by having two light valves operating on the same light beam or by having a light valve operating on the light from a glow lamp may also be used.

It has been found that routine color reproduction by electrooptical methods gives color quality superior to the equivalent photographic methods. The present invention improves the quality even further.

The present invention will be fully understood from the following description when read in connection with the accompanying drawings in which:

Fig. 1 illustrates schematically an electrooptical color reproduction system according to the prior art;

Figs. 2, 3, and 4 are schematic diagrams of the part of the electrical circuit which pertains to the present invention;

Figs. 5, 6, 7, and 8 are alternate forms of circuits for the embodiment shown in Figs. 2 and 3;

Fig. 9 shows typical response curves for a multigrid tube as used in Figs. 5 and 6;

Figs. 10 and 11 are alternate circuits for the embodiment shown in Fig. 4;

Fig. 12 is a graph showing the effect of masking on color densities.

Figure 1:
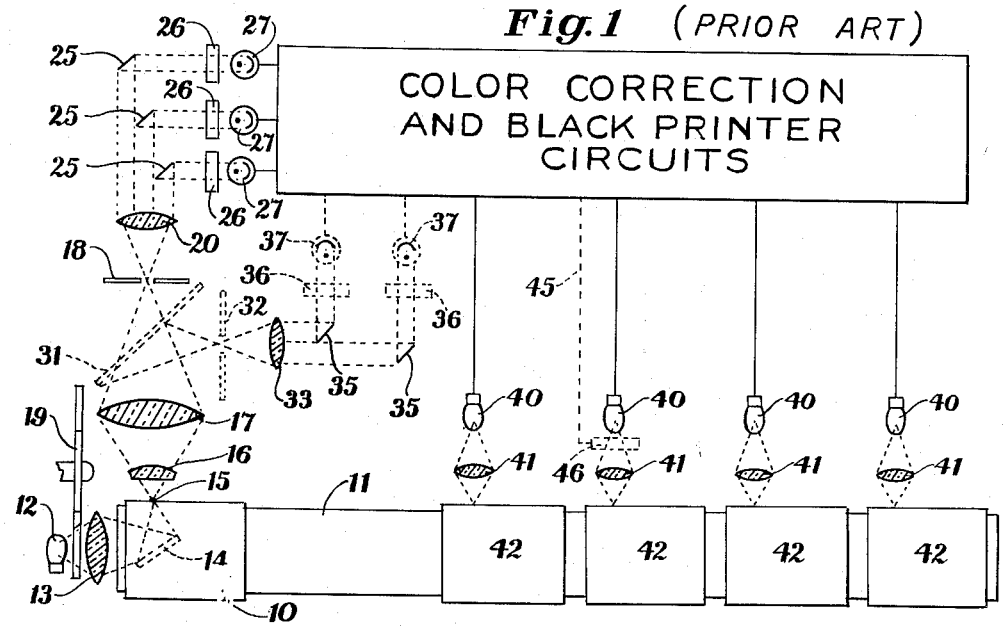

In Fig. 1 a multicolored original transparency 10 mounted on a rotating cylinder 11 (which is transparent at least at the end on which the transparency 10 is wrapped) is illuminated for scanning by a light source 12, a condenser lens 13 and a mirror 14. A small spot 15 on the transparency 10 is focused by a microscope objective consisting of lenses 16 and 17 on an aperture in a mask 18. The size of the aperture defines the effective size of the scanning dot. The light transmitted from this aperture 18 is collimated by a lens 20 and divided into three beams by mirrors 25 which reflect the three beams through primary color filters 26 to energize photoelectric cells 27. The output of the cells 27 constitute the red, green and blue signals used for the color reproduction process. A light chopper 19 interrupts the scanning beam to provide an A. C. signal and to permit A. C. amplification. In an alternative known form of the prior art, color separation negatives are made photographically and are individually and simultaneously scanned to give the red, green and blue signals. In one form of the prior art the blue signal is modified in accordance with the green signal, the green signal is modified in accordance with the red signal and the red, green and blue signals as modified operate light valves or glow lamps 40. Light from the glow lamps is focused by lenses 41 on photosensitive film 42 which is scanned synchronously with the scanning of the original picture (or the color separation negatives in the alternative system just mentioned). It is also customary to produce a black printer signal, for example by selecting the greatest of the three primary signals, and to modulate a fourth light valve or glow lamp 40 so as to produce a black separation record in addition to the three color separation records. Furthermore it is customary to reduce the red, green and blue signals in proportion to the black signal so that the black printer functions approximately according to what is sometimes termed "ideal" black printer operation. Instead of modulating one signal by another electrically, the red signal for example may through connections 45 operate a light valve 46 to modulate the light from the green signal glow lamp and thus to mask the green signal.

It is also known in the prior art that unsharp masking has certain advantages, and this may be accomplished by a semitransparent mirror 31 which reflects part of the original scanning beam into focus on a relatively large aperture in a mask 32. Light from this unsharp spot is collimated by a lens 33 and split by mirrors 35 into two or more beams which are appropriately colored by filters 36 to correspond to the desired masking colors, and the beams then illuminate photoelectric cells 37. For example, one of the filters 36 is predominantly red, with or without some primary blue being transmitted, and the signal from the corresponding photocell 37 is used to modify the "sharp" primary green signal.

All of this constitutes known prior art procedures and is described as the background for the present invention which is concerned with the method and apparatus for correcting one gross signal by its masking signal, whatever the source of the gross signal and whatever the source of the masking signal.

In the description of Figs. 2 through 10, the correction of the green signal by a masking signal which corresponds to a predominantly red color, either sharp or unsharp, will be discussed, but it will be understood that the methods and circuits described are equally applicable to the correction of blue by green.

Figure 2:
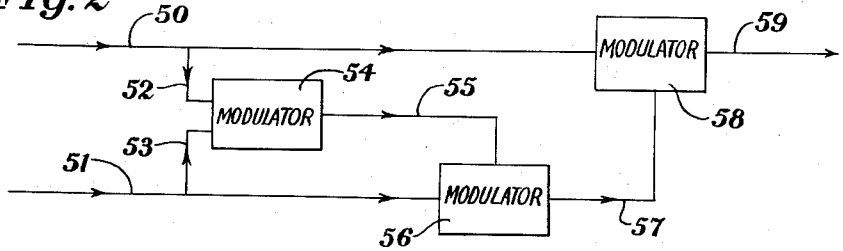

In Fig. 2 the green signal having a value of G is passing along the wire 50 and the predominantly red signal having a value of R for masking the green is passing along the wire 51. A portion of each signal as represented by wires 52 and 53 respectively, is fed into a circuit element 54 whose output, called the factor signal, along the wire 55 is a function of G and R. In one simple case it is a linear function of G divided by R. The exact form of this function is not critical to the present invention. The important point is the fact that this signal in the wire 55 must vary continuously, increasing with increasing G and decreasing with increasing R. If the function is a linear one between two limiting values, or if it is a curved one changing continuously between these same two limits, it still is able to give the proper correction at these two limits and also much better correction between these two limits than the prior art which involved no intentional or appreciable variation of the masking factor; the prior art simulated the constant masking factor characteristic of photographic processes. In fact, one may not be certain as to exactly which function is the theoretically most desirable, but any such function has been found to give a vast improvement over the prior methods of color correction. The factor signal in the wire 55 is fed into a circuit element 56 which also receives the red masking signal R and it modifies this masking signal R exponentially or approximately exponentially. The output from the element 56 is a signal on the wire 57 which is proportional to R raised to a masking factor $\gamma$ which is a function of both R and G as just discussed. This variable masking factor is fed into a circuit element 58 to modulate the gross green signal G in known manner by the inverse of the exponentially modified masking signal. The output or color corrected green signal on the wire 59 thus corresponds to the green signal masked by the red signal in which the masking factor varies between a minimum and a maximum depending on the relative intensities of the green and red signals.

Figure 3:
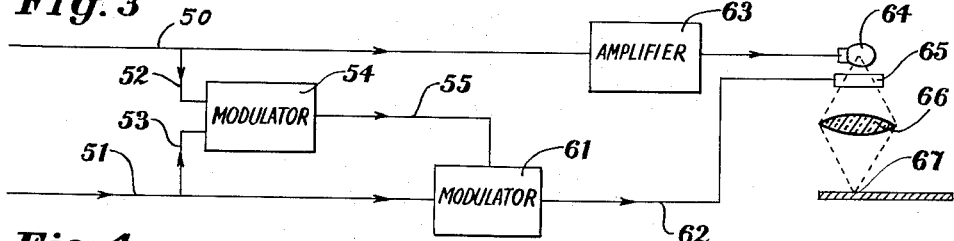

Fig. 3 shows a similar circuit in which the final modulation is produced optically. The gross green signal is fed through a suitable amplifier 63 to operate a glow lamp 64. The circuit element 61 in which the red masking signal is modified supplies the masking signal through wire 62 to a light valve 65 which modulates the light from the glow lamp 64 as it is being focused by a lens 66 at a point 67 on a photosensitive film. This form of the invention is the optical modulation equivalent of that shown in Fig. 2.

Figure 4:
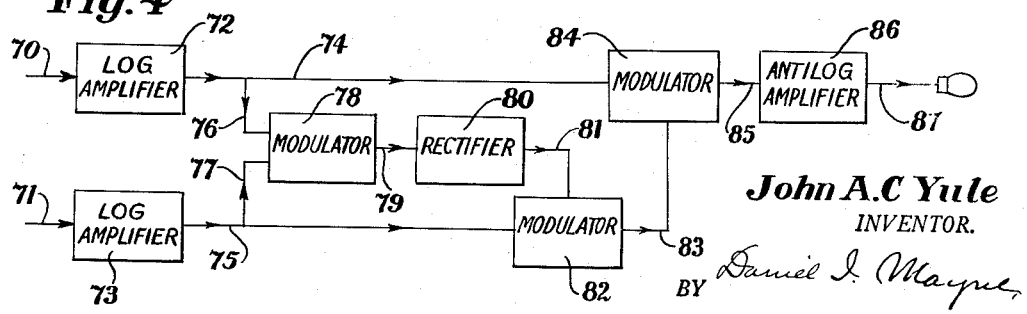

Fig. 4 shows another embodiment of the invention in which the green and red signals are fed by wires 70 and 71 respectively into logarithmic amplifiers 72 and 73 so that the signal on the wires 74 and 75 are respectively proportional to log G and log R. A portion of each signal as indicated by wires 76 and 77 is fed into circuit element 78 whose output on wire 79 is proportional to log G minus log R or alternatively to $$\frac{G}{R}$$

A further circuit element 80 adds a constant to this factor signal so that the output on the wire 81 is proportional to $A_1 + A_2$ (log G—log R) or to $$A_1 + A_2 \frac{G}{R}$$

where $A_1$ and $A_2$ are constants. This factor signal is then employed in circuit element 82 to multiply the red signal so that the output on wire 83 is proportional to:

$$(A_1 + A_2 \ (\log G - \log R)) \log R$$

or to $$\left(A_1 + A_2 \frac{G}{R}\right) \log R$$

This signal is then used to mask the green signal in circuit element 84 so that the signal on the output wire 85 is equal to:

$$\log G - (A_1 + A_2 \ (\log G - \log R)) \log R$$

or to $$\log G - \left(A_1 + A_2 \frac{G}{R}\right) \log R$$

Amplifier 86 is an anti-logarithmic amplifier and the output thereof on wire 87 operates a glow lamp for scanning a photosensitive film as discussed above.

In a practical example of the invention $A_1 = .4$ and $A_2 = .2$.

Figs. 2 and 4 thus constitute the preferred embodiments of my invention. The particular form of the circuit elements here shown in block is not at all critical, the only essential characteristic being the continuous variation in modulation between the limits discussed above. Specifically the red and green signals cooperate to produce a factor signal which then modifies the red signal before the latter is used to modify the gross green signal. The cooperation has the continuous variation and limits specified. Figs. 5 to 11 are merely examples of different circuits employing the invention.

Figure 7:
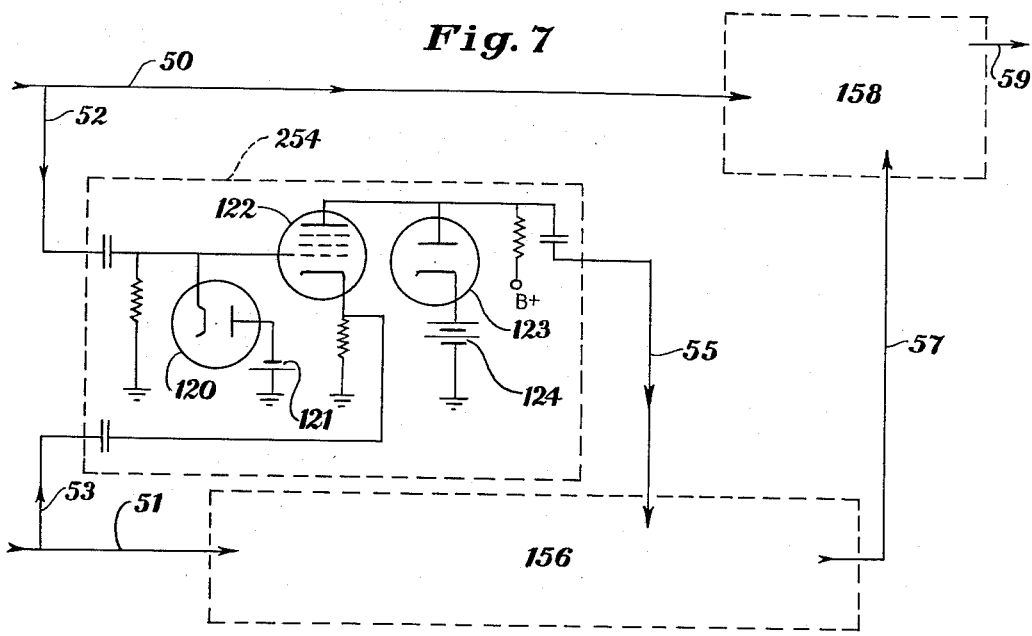
Figure 8:
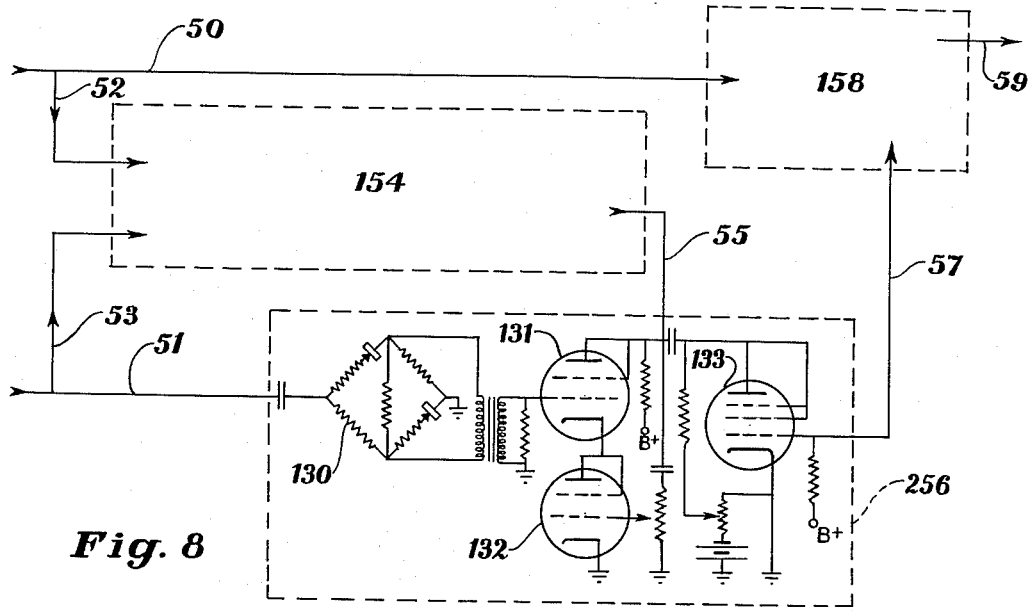

The factor signal produced in Fig. 7 is different from that in Figs. 5, 6 and 8.

The purely electrical modification of the red signal in Fig. 8 is different from the mechanoelectrical system of Figs. 5, 6 and 7.

The optical modulation of the green signal in Fig. 6 is different from the electrical modulation of Figs. 5, 7 and 8.

Fig. 5 illustrates schematically one form of electric circuit which can be used to provide the embodiment shown in the block diagram of Fig. 2; one embodiment of each of the modulator elements 54, 56 and 58 of Fig. 2 being shown at 154, 156 and 158 respectively. A linear function of G divided by R is accomplished over the required range in a multigrid tube 100 by impressing the green signal G (through wire 52) on the third control grid and "inverting" the red signal R before impressing it on the first control grid of the tube 100. After the red signal R is amplified in a pentode 101 and rectified in the tube 102, the rectified and filtered signal is tapped off the rectifier resistor 103 with such polarity that the voltage applied to the first control grid of the multigrid tube 100 becomes more negative with increasing R. Such methods of accomplishing the electrical equivalent of division are well known (e. g. U. S. 2,249,522 and U. S. 2,286,730 Hall). The characteristics of the multigrid tube 100 are utilized to maintain the masking factor signal between the limits $K_1$ and $K_2$. A family of typical characteristic curves of a multigrid tube (such as the 6SA7) shown in Fig. 9 illustrates the variations in the $i_p$ vs. $e_{g3}$ characteristic with changes in the potential on the first grid. It will be noted that the curves are characterized by long flat "toes" and flat "regions of saturation" above the shoulder of the curve. When the signal G applied to the third grid is a maximum and the signal R is a minimum (which means minimum negative bias on the first grid), the plate current $i_p$ is a maximum and $K_1$ is dependent upon the saturation current at the selected first grid bias. When G is a minimum and R is maximum, the plate current $i_p$ is a minimum and $K_2$ is determined on the toe of the $i_p - e_{g3}$ curve, which curve itself is a function of the D. C. bias on the first grid. In the modulator 156, (corresponding to 56 of Fig. 2) the signal R in wire 51 is amplified in the pentode 105 and through a rectifier 106 impressed across a nonlinear network which provides an output that is an exponential function of the input. Nonlinear networks are well known in the art and their application in electrooptical color correction is disclosed in the above-mentioned patents to Hall and in U. S. 2,517,586 Moe.

The particular nonlinear network shown in Fig. 5 comprises a parallel circuit having both linear and nonlinear impedance in each branch thereof connected in series with a variable impedance. One branch includes a pair of thyrite resistors 107 and 108 and a potentiometer 109 in series; the other branch includes a pair of potentiometers 110 and 111 in series with a thyrite resistor 112. The junctions of the two branches are connected through a variable resistor 114 across the output of the rectifier 106. The potentiometer 109, 110, and 111 are linearly or nonlinearly wound according to the output desired from the modulator 156. Nonlinear potentiometers are well known in the art and are constructed by the use of a shaped mandrel, by control of wire size, by control of wire spacing and other well known practices. Simple linear potentiometers are satisfactory for the present invention, however. As is well known, thyrite resistors are characterized by a high impedance at low applied voltages and decreasing impedance with increase in voltage. The potentiometers 109, 110, and 111 are ganged and driven from the common shaft of a control motor 150 which is regulated by the output signal $(G/R)$ on the wire 55 from the modulator 154. The angle of rotation of the servo shaft, and thus the settings of the potentiometers 109, 110 and 111 are functions of the signal $G/R$. In one preferable form, the potentiometers 109, 110, and 111 are so wound that the output signal is proportional to the input signal R raised to the exponent $G/R$, but the exact form of this circuit element and output function is not critical. Other nonlinear networks utilizing varistors or copper oxide or crystal diode rectifiers, are well known in the art, e. g., as disclosed in the above mentioned Hall patents, and may be utilized to provide the desired exponential response.

The operation of such a potentiometer circuit is well known and in the present example the parameters thereof are chosen to provide nonlinear response in which the exponent varies between the limits $K_1$ and $K_2$, e. g., between .25 and .50. At some points of some pictures the change may be so rapid that the control motor 115 fails to instantaneously follow extremely rapid variations of $G/R$, e. g., above $10^3$ cycles per second, but such occasions are rare and the disclosed circuit with its continuously variable masking factor is always a decided improvement over prior art apparatus in which the masking factor was a constant.

The output signal R raised to the exponent $R/G$ from the modulator 156 is tapped off "inverted" from a potentiometer 116 and passes along the wire 57. To accomplish division of the green signal G in wire 50 by the masking signal ($R^{G/R}$) in the wire 57, the amplified green signal is impressed on the third grid of a multigrid tube 117 of the modulator 158, and the masking signal applied to the first control grid is inverted by tapping across the potentiometer 116 with such polarity that the voltage becomes more negative with increasing amplitude of the output signal from the modulator 156. The output signal from the multigrid tube 117 is proportional to the green signal G divided by the red signal R raised to the exponent G/R.

Fig. 6 illustrates schematically one form of electric circuit which can be used to provide the embodiment shown in the block diagram of Fig. 3 and is similar to Fig. 5 with the exception that the output of the nonlinear network is impressed directly upon a light valve 65. The signal G operates a glow lamp 64 directly, and the masking signal $R^{G/R}$ through the light valve 65 modulates the intensity of the light from the glow lamp 64. A separate stage 163 of amplification is shown for simplicity, but the glow lamp 64 may alternatively be operated from the plate of tube 101 in unit 154.

Fig. 7 shows a second embodiment of the circuit of Fig. 2 in which the output of the modulator 254 (corresponding to 54 of Fig. 2) is a function of $(G-R)$ rather than the G/R relationship disclosed in Fig. 5. The signal R through wire 53 is impressed in the cathode circuit of a multigrid tube 122 while the signal G through wire 52 is applied in the grid circuit thereof. Increase in the amplitude of R increases the grid-cathode negative bias and thus decreases the plate current $i_p$; similarly, increase in the green signal G decreased the grid-cathode bias and thus increases the plate curent $i_p$. The resulting signal at the first grid as well as the output signal are thus both functions of $(G-R)$. Diodes 120 and 123 are utilized to clamp the value of the masking factor signal between the limits $K_1$ and $K_2$. A first diode 120 having its cathode connected to the grid of the multigrid tube 122 and having its plate connected to a source of potential 121 conducts whenever the grid bias becomes more negative than the source 121. This limits the minimum value $K_1$ of the masking factor signal $(G-R)$. The second diode 123 has its anode connected to the plate of the multigrid tube 122 and its cathode connected to a source of positive potential 124 and it conducts whenever the potential of the plate of the multigrid tube 122 becomes more positive than the potential source 124. This prevents the masking factor signal $(G-R)$ from increasing above a predetermined value $K_2$ which is a function of the potential of the source 124.

Fig. 8 illustrates a third embodiment of the circuit of Fig. 2 in which the modulator 256 (corresponding to 56 of Fig. 2) instantaneously provides an output signal which is a function of R raised to the desired exponent, e. g., to the exponent G/R. This circuit utilizes the mathematical relation:

$$\log R^N = N \log R$$

The red signal R arriving on wire 51 is amplified in a bridge crystal rectifier circuit 130 having a logarithmic response, and the output thereof is passed through a transformer and impressed on the grid of a tube 131 of a multiplying circuit which is essentially a cathode follower utilizing two tubes (such as 6K6) connected as triodes with the multiplying tube 132 as the cathode impedance. The cathode of tube 131 because of this impedance assumes a voltage proportional to log R. The signal $$\frac{G}{R}$$

arriving on wire 55 is impressed on the grid of tube 132 and the plate current through tube 132 (and through 131) is thus proportional to $$\left(\frac{G}{R}\right) \log R$$

Cathode follower types of multiplying circuits are shown in the text "Wave Forms" M. I. T. Radiation Laboratory Series, vol. 19, p. 669. A pentode 133 connected as an inverted triode is utilized to extract the antilogarithm of the signal $$\left(\frac{G}{R}\right) \log R$$

The screen and suppressor grids of the tube 133 are connected directly to the anode and the signal is applied directly to the anode which acts as a grid. The output current is drawn from the grid electrode which acts as a plate and follows the mathematical relation:

$$\log A_o i_o \text{ (output)} = A_i e_i \text{ (input)}$$

or $$A_o i_o = \text{antilog } A_i e_i$$

Thus the logarithm of the output current is proportional to the input voltage and antilogarithmic response is obtained.

Figure 10:
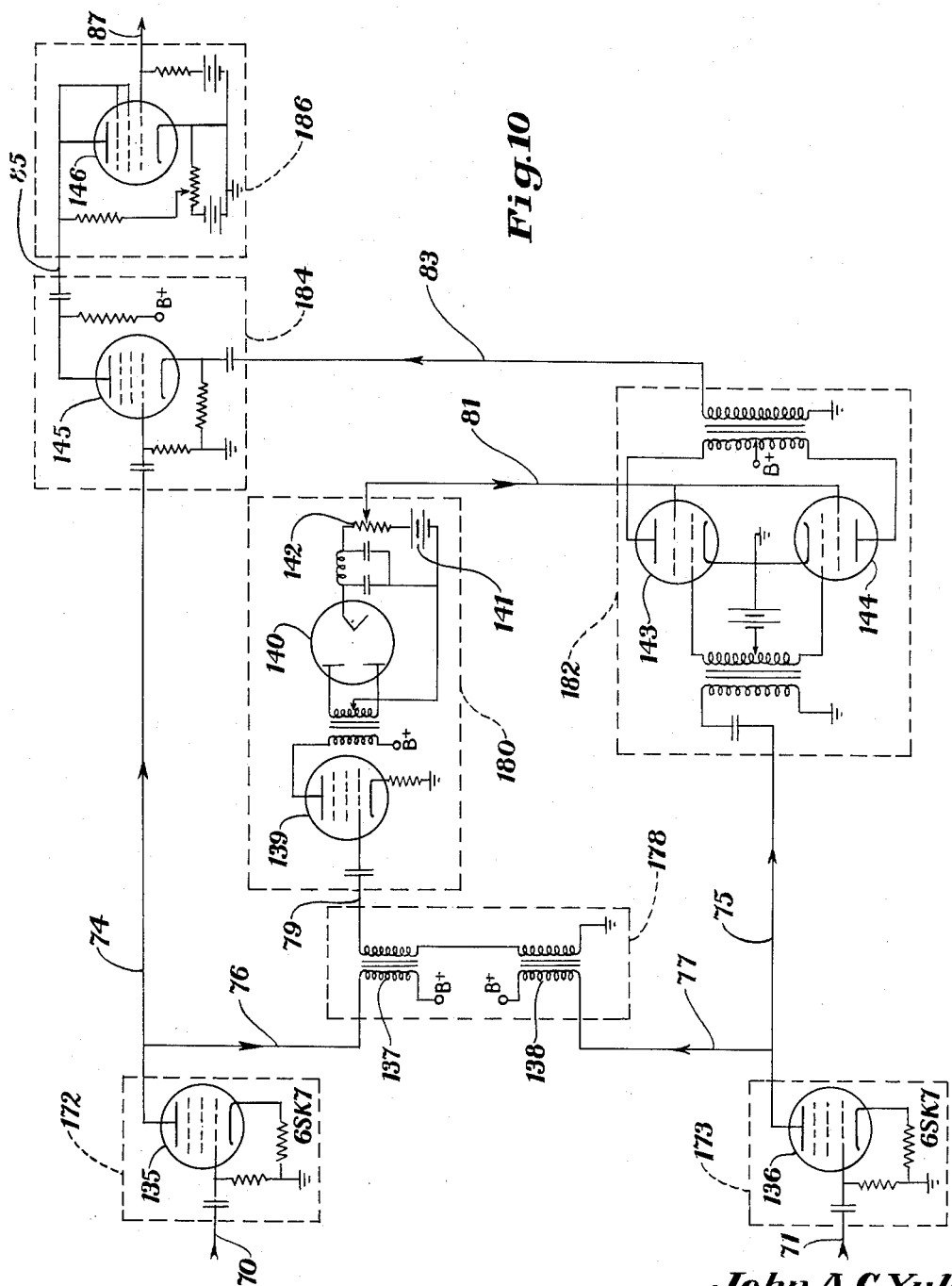

Fig. 10 illustrates schematically one form of electric circuit which can be utilized in the embodiment shown in Fig. 4. Logarithmic amplifiers are well known in the art and the type utilized for a specific purpose is dependent upon the allowable error, frequency response, the necessity of low output impedance and high voltage levels, etc. A well known bridge type of logarithmic amplifier disclosed in Fig. 8 provides extremely accurate logarithmic response. A variable mu tube is also capable of an output which is proportional to the log of the input, i. e., the $i_p{:}e_g$ characteristic is logarithmic. The response of a variable mu tube such as a 6SK7 is logarithmic over a range of $-4$ to $-10$ volts, i. e., within the specified range of voltages the plate current is proportional to the logarithm of the input grid voltage. The greater the cathode resistance, the greater is the useful range of the $i_p{:}e_g$ characteristic. This logarithmic response is taken advantage of in the schematic circuit of Fig. 10 wherein the variable mu 6SK7 tubes 135 and 136 are used for the modulators 172 and 173 corresponding to 72 and 73 of Fig. 4 to logarithmically amplify the green signal G and the red signal R respectively. Electric circuits adapted to accomplish subtraction of two signals are also well known, and as hereinbefore described the modulator 154 in Fig. 7 includes a triode in which one signal is applied in the grid circuit and a second signal is impressed across the cathode resistor in order to accomplish modulation of the $(G-R)$ type. In Fig. 10 two transformers 137 and 138 receiving log G and log R signals over wires 76 and 77 have their secondaries connected in series in the modulator 178 to provide a signal on wire 79 which is a function of log $G-\log R$. A constant $A_2$ is provided by amplifying this signal in a pentode 139 and after rectification in the rectifier tube 140, another constant $A_1$ is added in the form of a source of D. C. potential 141 in series with the rectifier resistor 142. The output wire 81 thus carries a signal $A_1 + A_2 (\log G - \log R)$. Multiplication thereof by the log R signal in wire 75 is accomplished in the modulator 182 corresponding to 82 of Fig. 5 by impressing the electrical signal in wire 81 on the second grids of two multigrid tubes 143 and 144 connected in push-pull in a multiplier circuit with the signal in wire 75 impressed on the first control grids. Subtraction of the signal log R $[A_1+A_2(\log G - \log R)]$ on the wire 83 from the signal log G is accomplished in a multigrid tube 145 in the modulator 184 by connecting one signal in the grid circuit and the second signal in the cathode circuit (just as in Fig. 7). The output on wire 85 is then fed into a modulator 186 in which a pentode 146 is connected as an inverted triode to extract the antilogarithm of a signal in exactly the same manner as accomplished in the tube 133 of Fig. 8. The output of wire 87 is thus:

antilog $[\log G - (A_1+A_2(\log G - \log R)) \log R]$ which equals $$\frac{G}{R^{(A_1+A_2(\log G - \log R))}}$$

This is a third way in which the masking factor can vary with R and G, namely in accordance with the difference of their logarithms.

Fig. 11 is very similar in form to Fig. 10, but replaces the subtracting unit 178 with a combination subtracting and antilog unit 278 which consists of a combination of unit 178 and one corresponding to unit 186. That is, the tube 147 operates in the same way as tube 146 of Fig. 10. Thus in Fig. 11, the wire 79 carries a signal proportional to $G/R$. The wire 81 carries a signal: $A_1+A_2G/R$. The wire 83 carries a signal:

$$\left(A_1+A_2\frac{G}{R}\right)\log R$$

The wire 85 accordingly carries a signal:

$$\log G-\left(A_1+A_2\frac{G}{R}\right)\log R$$

and the final output on wire 87 is $$\frac{G}{R^{\left(A_1+A_2\frac{G}{R}\right)}}$$

It is to be understood that none of the disclosed circuits, nor the elements thereof, constitute a critical part of the present invention and are included merely to illustrate various forms of electrical circuit adapted to accomplish the desired result. The exact circuit adopted for an electro-optical color correction installation depends upon the accuracy required, the speed of scanning (and thus the frequency), the requirements for high voltage levels and low impedance levels, and other practical considerations.

The need for different masking factors for different colors was explained at length in my J. O. S. A. article in 1938, mentioned above. The use of a single mask (constant masking factor) and other approximations were discussed in the article. The manner in which the present invention solves the problem set forth in the 1938 article is described below with reference to Fig. 12 (which corresponds to Fig. 8 of the article).

In Fig. 12 the red density and green density of various colors are plotted along parallel ordinates. For example, the red density of YM red is quite low of course and equals about .07 whereas the green density (i. e. the density through a primary green filter) equals about .8. White is taken as zero density to both red and green. As explained in the J. O. S. A. article the masking factors (or percentage mask) are plotted as abscissae. In the example given, a 54% mask will match YC green to white. If YC green had zero green density, the YC line joining the red and green densities would go to the base of the green density line and of course no mask (zero masking factor) would be required. But since YC green has a green density of .6, masking is required.

Similarly if the green density of red and black were the same there would be no need to mask the green as far as the reproduction of reds is concerned. However, YM red and YMC black have slightly different green densities and the required masking factor is determined by where the YM and YMC lines cross at 201. A 19% mask is indicated in this particular example. Ordinary masking is a compromise between these two requirements and uses about a 40% mask as indicated by the broken line 200. This compromise means that the reds are overcorrected and the greens are undercorrected. The present invention gives a factor which varies from about 19% to about 54%. Useful results are obtained in this example with a lower limit anywhere between 10% and 28% and an upper limit between 45% and 63%. Also the limits depend on the inks used which of course is not surprising since the main purpose of masking is to correct for ink deficiencies. However, the examples given above are typical. Printing inks in common use for three or four color processes all require about the same range of masking. The masking is in terms of the three colors and the effects of the black printer are not considered in selecting the masking factors; for example "black" is YMC black not any darker shade obtained by adding black ink.

Having thus described the preferred embodiments of my invention, I wish to point out that it is not limited to the use of these particular circuits, but is of the scope of the appended claims.

I claim:

1. In an electrooptical color reproduction process having an electrical signal corresponding to a scanned primary green component of a multicolored original and a masking signal corresponding to a scanned, predominantly red, component of said original, the method of color correcting said green signal by said masking signal which comprises producing a factor signal with a value between $K_1$ and $K_2$, which increases continuously with increasing green signal and decreases continuously with increasing masking signal where $K_1$ is the masking factor which matches the green signal from YM red to that from YMC black and where $K_2$ is the masking factor which matches the green signal from YC green to that from white, modifying the masking signal by said factor signal exponentially and dividing said green signal by the exponentially modified masking signal.

2. In an electrooptical color reproduction process having an electrical signal corresponding to a scanned primary green component of a multicolored original and a masking signal corresponding to a scanned, predominantly red, component of said original, the method of color correcting said green signal by said masking signal which comprises producing a factor signal which varies over a range from a lower limit $L_1$ to an upper limit $L_2$ where $L_1$ is between $$K_1-\tfrac{1}{4}(K_2-K_1)$$

and $$K_1+\tfrac{1}{4}(K_2-K_1)$$

and $L_2$ is between $$K_2-\tfrac{1}{4}(K_2-K_1)$$

and $$K_2+\tfrac{1}{4}(K_2-K_1)$$

which factor signal increases continuously with increasing green signal and decreases continuously with increasing masking signal where $K_1$ is the masking factor which matches the green signal from YM red to that from YMC black and where $K_2$ is the masking factor which matches the green signal from YC green to that from white, modifying the masking signal by said factor signal exponentially and dividing said green signal by the exponentially modified masking signal.

3. In an electrooptical color reproduction process having an electrical signal corresponding to a scanned primary blue component of a multicolored original and a masking signal corresponding to a scanned, predominantly green, component of said original, the method of color correcting said blue signal by said masking signal which comprises producing a factor signal with a value between $K_1$ and $K_2$ which increases continuously with increasing blue signal and decreases continuously with increasing masking signal where $K_1$ is the masking factor which matches the blue signal from YC green to that from YMC black and where $K_2$ is the masking factor which matches the blue signal from a MC blue to that from white, modifying the masking signal by said factor signal exponentially and dividing said blue signal by the exponentially modified masking signal.

4. In an electrooptical color reproduction process having an electrical signal corresponding to a scanned primary blue component of a multicolored original and a masking signal corresponding to a scanned, predominantly green, component of said original, the method of color correcting said blue signal by said masking signal which comprises producing a factor signal which varies over a range from a lower limit $L_1$ to an upper limit $L_2$ where $L_1$ is between $$K_1 - \tfrac{1}{4}(K_2 - K_1)$$

and $$K_1 + \tfrac{1}{4}(K_2 - K_1)$$

and $L_2$ is between $$K_2 - \tfrac{1}{4}(K_2 - K_1)$$

and $$K_2 + \tfrac{1}{4}(K_2 - K_1)$$

which factor signal increases continuously with increasing blue signal and decreases continuously with increasing masking signal where $K_1$ is the masking factor which matches the blue signal from YC green to that from YMC black and where $K_2$ is the masking factor which matches the blue signal from a MC blue to that from white, modifying the masking signal by said factor signal exponentially and dividing said blue signal by the exponentially modified masking signal.

5. In an electrooptical color reproduction process having electrical signals corresponding to scanned color components of a multicolored original including a primary red, a gross primary green, a gross primary blue and a masking signal for at least one of said gross signals, the predominant masking color for green being red and for blue being green, the method of color correcting a gross color signal by its masking signal which comprises producing a factor signal with a value between $K_1$ and $K_2$, which increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, modifying the masking signal by said factor signal exponentially and modulating the gross signal multiplying it by the inverse of the exponentially modified masking signal.

6. In an electrooptical color reproduction process having electrical signals corresponding to scanned color components of a multicolored original including a primary red, a gross primary green, a gross primary blue and a masking signal for at least one of said gross signals, the predominant masking color for green being red and for blue being green, the method of color correcting a gross color signal by its masking signal which comprises producing a factor signal which varies over a range from a lower limit $L_1$ to an upper limit $L_2$ where $L_1$ is between $$K_1 - \tfrac{1}{4}(K_2 - K_1)$$

and $$K_1 + \tfrac{1}{4}(K_2 - K_1)$$

and $L_2$ is between $$K_2 - \tfrac{1}{4}(K_2 - K_1)$$

and $$K_2 + \tfrac{1}{4}(K_2 - K_1).$$

which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, modifying the masking signal by said factor signal exponentially and modulating the gross signal multiplying it by the inverse of the exponentially modified masking signal.

7. In an electrooptical color reproduction process having electrical signals corresponding to scanned color components of a multicolored original including a primary red, a gross primary green, a gross primary blue and a masking signal for at least one of said gross signals, the predominant masking color for green being red and for blue being green, the method of color correcting a gross color signal by its masking signal which comprises producing a factor signal which varies over a range from a lower limit $L_1$ to an upper limit $L_2$ where $L_1$ is between $K_1 - \tfrac{1}{4}(K_2 - K_1)$ and $K_1 + \tfrac{1}{4}(K_2 - K_1)$ and $L_2$ is between $K_2 - \tfrac{1}{4}(K_2 - K_1)$ and $K_2 + \tfrac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, modifying the masking signal by said factor signal exponentially and producing a light beam whose intensity is proportional to said gross signal multiplied by the inverse of the exponentially modified masking signal.

8. In an electrooptical color reproduction process having electrical signals corresponding to scanned color components of a multicolored original including a primary red, a gross primary green, a gross primary blue and a masking signal for at least one of said gross signals, the predominant masking color for green being red and for blue being green, the method of color correcting a gross color signal by its masking signal which comprises producing a factor signal which varies over a range from a lower limit $L_1$ to an upper limit $L_2$ where $L_1$ is between $K_1 - \tfrac{1}{4}(K_2 - K_1)$ and $K_1 + \tfrac{1}{4}(K_2 - K_1)$ and $L_2$ is between $K_2 - \tfrac{1}{4}(K_2 - K_1)$ and $K_2 + \tfrac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to a gross signal from a white patch, modifying the masking signal by said factor signal according to a constant $K_3 + S^F$ where $S$ is the masking signal and $F$ is the factor signal and modulating the gross signal dividing it by the $K_3 + S^F$ signal.

9. In an electrooptical color reproduction process having electrical signals corresponding to scanned color components of a multicolored original including a primary red, a gross primary green, a gross primary blue and a masking signal for at least one of said gross signals, the predominant masking color for green being red and for blue being green, the method of color correcting a gross color signal by its masking signal which comprises producing a factor signal which varies over a range from a lower limit $L_1$ to an upper limit $L_2$ where $L_1$ is between $K_1 - \tfrac{1}{4}(K_2 - K_1)$ and $K_1 + \tfrac{1}{4}(K_2 - K_1)$ and $L_2$ is between $K_2 - \tfrac{1}{4}(K_2 - K_1)$ and $K_2 + \tfrac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, modifying the masking signal by said factor signal according to a constant $K_3 + S^F$ where $S$ is the masking signal and $F$ is the factor signal and producing a light beam whose intensity is proportional to said gross signal divided by $(K_3 + S^F)$.

10. In an electrooptical color reproduction process having electrical signals corresponding to the primary red, green and blue components of a beam scanning a multicolored original, the method of color correcting the green signal which comprises modifying a signal proportional to the red signal exponentially by a factor signal proportional to a constant plus the green signal divided by the red signal and producing a signal proportional to said green signal divided by the exponentially modified signal.

11. In an electrooptical color reproduction process having electrical signals corresponding to the primary red, green and blue components of a beam scanning a multi-colored original, the method of color correcting the green signal which comprises producing, from the red and green signals, signals respectively proportional to the logarithms thereof, producing, from the logarithm signals, a signal proportional to the difference between the logarithm green and logarithm red signals, producing from the difference signal, a ratio signal proportional to the antilog of the difference signal, producing from the ratio signal a factor signal proportional to a constant plus a second constant times said ratio, producing, from the factor signal and the logarithm red signal, a masking signal equal to the product of said factor signal and said logarithm red signal, producing, from the masking signal and the logarithm green signal, a corrected logarithm green signal proportional to said logarithm green signal minus said masking signal and producing, from said corrected logarithm green signal, a corrected green signal proportional to the antilog of said corrected logarithm green signal.

12. In an electrooptical color reproduction process having electrical signals corresponding to the primary red, green and blue components of a beam scanning a multi-colored original, the method of color correcting the green signal which comprises producing, from the red and green signals, signals respectively proportional to the logarithms thereof, producing, from the logarithm signals, a factor signal proportional to a constant plus a second constant times the difference between the logarithm green and logarithm red signals, producing, from the factor signal and the logarithm red signal, a masking signal equal to the product of said factor signal and said logarithm red signal, producing, from the masking signal and the logarithm green signal, a corrected logarithm green signal proportional to said logarithm green signal minus said masking signal and producing, from said corrected logarithm green signal, a corrected green signal proportional to the antilog of said corrected logarithm green signal.

13. In an electrooptical color reproduction process having an electrical signal corresponding to a scanned primary green component of a multicolored original and a masking signal corresponding to a scanned, predominantly red, component of said original, the method of color correcting said green signal by said masking signal which comprises producing a factor signal with a value between $K_1$ and $K_2$ which increases continuously with increasing green signal and decreases continuously with increasing masking signal where $K_1$ is the masking factor which matches the green signal from YM red to that from YMC black and where $K_2$ is the masking factor which matches the green signal from CY green to that from white, modifying the masking signal by said factor signal substantially exponentially and producing a signal approximately equal to said green signal divided by a constant plus the exponentially modified masking signal.

14. In an electrooptical color reproduction process having electrical signals corresponding to the primary red, green and blue components of a beam scanning a multi-colored original, the method of color correcting the green signal which comprises modulating the green signal by a masking signal which increases continuously with increasing red signal, which secondly increases exponentially with increasing green signal, thirdly decreases exponentially with increasing red signal, fourthly approximately matches the green signal from YM red to the green signal from YMC black and fifthly approximately matches the green signal from CY green to the green signal from white.

15. In an electrooptical color reproduction system having channels carrying an electrical signal corresponding to a scanned primary green component of a multi-colored original and a masking signal corresponding to a scanned, predominantly red, component of said original, apparatus for color correcting said green signal by said masking signal which comprises means for producing a factor signal with a value between $K_1$ and $K_2$, which increases continuously with increasing green signal and decreases continuously with increasing masking signal where $K_1$ is the masking factor which matches the green signal from YM red to that from YMC black and where $K_2$ is the masking factor which matches the green signal from YC green to that from white, means for modifying the masking signal by said factor signal exponentially and means for dividing said green signal by the exponentially modified masking signal.

16. In an electrooptical color reproduction system having an electrical signal corresponding to a scanned primary green component of a multicolored original and a masking signal corresponding to a scanned, predominantly red, component of said original, apparatus for color correcting said green signal by said masking signal which comprises means for producing a factor signal which varies over a range from a lower limit $L_1$ to an upper limit $L_2$ where $L_1$ is between $K_1 - \frac{1}{4}(K_2-K_1)$ and $K_1 + \frac{1}{4}(K_2-K_1)$ and $L_2$ is between $K_2 - \frac{1}{4}(K_2-K_1)$ and $K_2 + \frac{1}{4}(K_2-K_1)$, which factor signal increases continuously with increasing green signal and decreases continuously with increasing masking signal where $K_1$ is the masking factor which matches the green signal from YM red to that from YMC black and where $K_2$ is the masking factor which matches the green signal from YC green to that from white, means for modifying the masking signal by said factor signal exponentially and means for dividing said green signal by the exponentially modified masking signal.

17. In an electrooptical color reproduction system having an electrical signal corresponding to a scanned primary blue component of a multicolored original and a masking signal corresponding to a scanned, predominantly green, component of said original, apparatus for color correcting said blue signal by said masking signal which comprises means for producing a factor signal with a value between $K_1$ and $K_2$ which increases continuously with increasing blue signal and decreases continuously with increasing masking signal where $K_1$ is the masking factor which matches the blue signal from YC green to that from YMC black and where $K_2$ is the masking factor which matches the blue signal from a MC blue to that from white, means for modifying the masking signal by said factor signal exponentially and means for dividing said blue signal by the exponentially modified masking signal.

18. In an electrooptical color reproduction system having an electrical signal corresponding to a scanned primary blue component of a multicolored original and a masking signal corresponding to a scanned, predominantly green, component of said original, apparatus for color correcting said blue signal by said masking signal which comprises means for producing a factor signal which varies over a range from a lower limit $L_1$ to an upper limit $L_2$ where $L_1$ is between $K_1 - \frac{1}{4}(K_2-K_1)$ and $K_1 + \frac{1}{4}(K_2-K_1)$ and $L_2$ is between $K_2 - \frac{1}{4}(K_2-K_1)$ and $K_2 + \frac{1}{4}(K_2-K_1)$, which factor signal increases continuously with increasing blue signal and decreases continuously with increasing masking signal where $K_1$ is the masking factor which matches the blue signal from YC green to that from YMC black and where $K_2$ is the masking factor which matches the blue signal from a MC blue to that from white, means for modifying the masking signal by said factor signal exponentially and means for dividing said blue signal by the exponentially modified masking signal.

19. In an electrooptical color reproduction system having electrical signals corresponding to scanned color components of a multicolored original including a primary red, a gross primary green, a gross primary blue and a masking signal for at least one of said gross signals, the predominant masking color for green being red and for blue being green, apparatus for color correcting a gross color signal by its masking signal which comprises means for producing a factor signal with a value between $K_1$ and $K_2$, which increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, means for modifying the masking signal by said factor signal exponentially and means for modulating the gross signal multiplying it by the inverse of the exponentially modified masking signal.

20. In an electrooptical color reproduction system having electrical signals corresponding to scanned color components of a multicolored original including a primary red, a gross primary green, a gross primary blue and a masking signal for at least one of said gross signals, the predominant masking color for green being red and for blue being green, apparatus for color correcting a gross color signal by its masking signal which comprises means for producing a factor signal which varies over a range from a lower limit $L_1$ to an upper limit $L_2$ where $L_1$ is between $K_1 - \frac{1}{4}(K_2 - K_1)$ and $K_1 + \frac{1}{4}(K_2 - K_1)$ and $L_2$ is between $K_2 - \frac{1}{4}(K_2 - K_1)$ and $K_2 + \frac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, means for modifying the masking signal by said factor signal exponentially and means for modulating the gross signal multiplying it by the inverse of the exponentially modified masking signal.

21. In an electrooptical color reproduction system having electrical signals corresponding to scanned color components of a multicolored original including a primary red, a gross primary green, a gross primary blue and a masking signal for at least one of said gross signals, the predominant masking color for green being red and for blue being green, apparatus for color correcting a gross color signal by its masking signal which comprises means for producing a factor signal which varies over a range from a lower limit $L_1$ to an upper limit $L_2$ where $L_1$ is between $K_1 - \frac{1}{4}(K_2 - K_1)$ and $K_1 + \frac{1}{4}(K_2 - K_1)$ and $L_2$ is between $K_2 - \frac{1}{4}(K_2 - K_1)$ and $K_2 + \frac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, means for modifying the masking signal by said factor signal exponentially and means for producing a light beam whose intensity is proportional to said gross signal multiplied by the inverse of the exponentially modified masking signal.

22. In an electrooptical color reproduction system having electrical signals corresponding to scanned color components of a multicolored original including a primary red, a gross primary green, a gross primary blue and a masking signal for at least one of said gross signals, the predominant masking color for green being red and for blue being green, apparatus for color correcting a gross color signal by its masking signal which comprises means for producing a factor signal which varies over a range from a lower limit $L_1$ to an upper limit $L_2$ where $L_1$ is between $K_1 - \frac{1}{4}(K_2 - K_1)$ and $K_1 + \frac{1}{4}(K_2 - K_1)$ and $L_2$ is between $K_2 - \frac{1}{4}(K_2 - K_1)$ and $K_2 + \frac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, means for modifying the masking signal by said factor signal according to a constant $K_3$ plus $S^F$ where S is the masking signal and F is the factor signal and means for modulating the gross signal dividing it by the $K_3 + S^F$ signal.

23. In an electrooptical color reproduction system having electrical signals corresponding to scanned color components of a multicolored original including a primary red, a gross primary green, a gross primary blue and a masking signal for at least one of said gross signals, the predominant masking color for green being red and for blue being green, apparatus for color correcting a gross color signal by its masking signal which comprises means for producing a factor signal which varies over a range from a lower limit $L_1$ to an upper limit $L_2$ where $L_1$ is between $K_1 - \frac{1}{4}(K_2 - K_1)$ and $K_1 + \frac{1}{4}(K_2 - K_1)$ and $L_2$ is between $K_2 - \frac{1}{4}(K_2 - K_1)$ and $K_2 + \frac{1}{4}(K_2 - K_1)$, which factor signal increases continuously with increasing gross signal and decreases continuously with increasing masking signal where $K_1$ is the masking factor which matches the gross signal from a full color patch of the predominant masking color for said gross color to the gross signal from a full black patch and where $K_2$ is the masking factor which matches the gross signal from a full color patch of said gross color to the gross signal from a white patch, means for modifying the masking signal by said factor signal according to a constant $K_3$ plus $S^F$ where S is the masking signal and F is the factor signal and means for producing a light beam whose intensity is proportional to said gross signal divided by $(K_3 + S^F)$.

24. In an electrooptical color reproduction system having electrical signals corresponding to the primary red, green and blue components of a beam scanning a multicolored original, apparatus for color correcting the green signal which comprises means for modifying a signal proportional to the red signal exponentially by a factor signal proportional to a constant plus the green signal divided by the red signal and means for producing a signal proportional to said green signal divided by the exponentially modified signal.

25. In an electrooptical color reproduction system having electrical signals corresponding to the primary red, green and blue components of a beam scanning a multicolored original, apparatus for color correcting the green signal which comprises means for producing, from the red and green signals, signals respectively proportional to the logarithms thereof, means for producing, from the logarithm signals, a signal proportional to the difference between the logarithm green and logarithm red signals, means for producing from the difference signals, a ratio signal proportional to the antilog of the difference signal, means for producing, from the factor signal and the logarithm red signal, a masking signal equal to the product of said factor signal and said logarithm red signal, means for producing, from the masking signal and the logarithm green signal, a corrected logarithm green signal proportional to said logarithm green signal minus said masking signal and means for producing, from said corrected logarithm green signal, a corrected green signal proportional to the antilog of said corrected logarithm green signal.

26. In an electrooptical color reproduction system having electrical signals corresponding to the primary red, green and blue components of a beam scanning a multicolored original, apparatus for color correcting the green signal which comprises means for producing, from the red and green signals, signals respectively proportional to the logarithms thereof, means for producing, from the logarithm signals, a factor signal proportional to a constant plus a second constant times the difference between the logarithm green and logarithm red signals, means for producing, from the factor signal and the logarithm red signal, a masking signal equal to the product of said factor signal and said logarithm red signal, means for producing, from the masking signal and the logarithm green signal, a corrected logarithm green signal proportional to said logarithm green signal minus said masking signal and means for producing, from said corrected logarithm green signal, a corrected green signal proportional to the antilog of said corrected logarithm green signal.

27. In an electrooptical color reproduction system having an electrical signal corresponding to a scanned primary green component of a multicolored original and a masking signal corresponding to a scanned, predominantly red, component of said original, apparatus for color correcting said green signal by said masking signal which comprises means for producing a factor signal with a value between $K_1$ and $K_2$ which increases continuously with increasing green signal and decreases continuously with increasing masking signal where $K_1$ is the masking factor which matches the green signal from YM red to that from YMC black and where $K_2$ is the masking factor which matches the green signal from CY green to that from white, means for modifying the masking signal by said factor signal substantially exponentially and means for producing a signal approximately equal to said green signal divided by a constant plus the exponentially modified masking signal.

28. In an electrooptical color reproduction system having electrical signals corresponding to the primary red, green and blue components of a beam scanning a multicolored original, apparatus for color correcting the green signal which comprises means for modulating the green signal by a masking signal which increases continuously with increasing red signal, which secondly increases exponentially with increasing green signal, thirdly decreases exponentially with increasing red signal, fourthly approximately matches the green signal from YM red to the green signal from YMC black and fifthly approximately matches the green signal from CY green to the green signal from white.

References Cited in the file of this patent

UNITED STATES PATENTS

| | | |
|---|---|---|
| 2,492,926 | Valensi | Dec. 27, 1949 |
| 2,560,567 | Gunderson | July 17, 1951 |